(12) United States Patent
Chen (10) Patent No.: US 9,581,268 B2
(45) Date of Patent: Feb. 28, 2017

(54) VALVE WITH AN ANTI-LOOSENING STEM

(71) Applicant: VALUE VALVES CO., LTD., New Taipei (TW)

(72) Inventor: Tsung-Hsiao Chen, New Taipei (TW)

(73) Assignee: VALUE VALVES CO., LTD., New Taipei (TW)

( * ) Notice: Subject to any disclaimer, the term of this patent is extended or adjusted under 35 U.S.C. 154(b) by 0 days.

(21) Appl. No.: 14/977,107

(22) Filed: Dec. 21, 2015

(65) Prior Publication Data

US 2016/0348801 A1 Dec. 1, 2016

(30) Foreign Application Priority Data

May 29, 2015 (TW) .............................. 104117552 A (51) Int. Cl.
*F16K 31/44* (2006.01)
*F16K 5/06* (2006.01)
*F16K 41/02* (2006.01)

(52) U.S. Cl.
CPC ............ *F16K 31/44* (2013.01); *F16K 5/0605* (2013.01); *F16K 5/0642* (2013.01); *F16K 41/026* (2013.01)

(58) Field of Classification Search
CPC ...... F16K 31/44; F16K 41/026; F16K 5/0605; F16K 5/0642
USPC .................... 251/214, 315.1, 315.14, 315.16
See application file for complete search history.

(56) References Cited

U.S. PATENT DOCUMENTS

| 4,230,154 A * | 10/1980 | Kalbfleish | F16K 5/10 251/315.16 |
| 6,095,493 A * | 8/2000 | Velan | F16K 5/0647 251/214 |
| 6,981,691 B2 * | 1/2006 | Caprera | F16K 5/12 251/315.16 |
| 7,093,819 B1 * | 8/2006 | Hall | F16K 5/0642 251/214 |
| 7,347,408 B2 * | 3/2008 | Keiser | F16K 5/0605 251/315.08 |
| 8,398,055 B2 * | 3/2013 | Yin | F16K 5/0605 251/214 |
| 8,490,949 B2 * | 7/2013 | Lanning | F16K 5/0647 251/315.14 |
| 2013/0056667 A1 * | 3/2013 | Shu | F16K 47/08 251/305 |
| 2014/0097371 A1 * | 4/2014 | Huynh | F16K 5/0647 251/315.16 |

* cited by examiner

*Primary Examiner* — John Bastianelli
(74) *Attorney, Agent, or Firm* — Ming Chow; Sinorica, LLC (57) ABSTRACT

A valve has a valve body, a valve member, a bonnet, an anti-loosening stem and multiple fillers. The valve member is mounted inside the valve body, and has a first mounting part and a groove that is defined annually in the first mounting part. The anti-loosening stem is mounted through the valve body, and has multiple embedding elements and a second mounting part that is mounted in the first mounting part. The embedding elements are mounted radially in the anti-loosening stem and abut the groove. Thus, the anti-loosening stem is mounted firmly in the valve member. The bonnet abuts the fillers and is mounted in the valve body. Therefore, the anti-loosening stem is prevented from detaching or jetting out of the valve member and damaging the user when removing the bonnet to replace the fillers.

12 Claims, 6 Drawing Sheets

VALVE WITH AN ANTI-LOOSENING STEM

The current application claims a foreign priority to application number 104117552 filed on May 29, 2015 in Taiwan.

BACKGROUND OF THE INVENTION

1. Field of the Invention

The present invention relates to a valve, and more particularly to a valve with an anti-loosening stem that is mounted firmly in a valve member. The valve prevents the anti-loosening stem from being jetted out of the valve member which damages users who remove a bonnet to replace fillers.

2. Description of the Related Art

A ball valve has a valve body, a spherical member and a stem. The stem is mounted through the valve body and mounted in the spherical member that is mounted inside a valve body and has a through hole defined through the spherical member. A user manipulates the stem to rotate the spherical member, and the spherical member controls fluid inside a pipe system to circulate or to close.

With regard to a conventional ball valve, for example, as disclosed in utility model patent No. TW311669, a stem is mounted in a spherical member and has an extending part that is formed at one of two ends of the stem. The spherical member has a recess that receives the extending part of the stem and is defined in a top end of the spherical member. To control a pipe system, a user manipulates the stem to rotate the spherical member.

A filler is mounted between the stem and the valve body to prevent fluid leakage along the stem because of high fluid pressure in the pipe system when the fluid passes through the ball valve. Furthermore, a bonnet is mounted around the stem and the filler to stick the valve body.

When fatigue occurs to the filler because of long term usage, the sealing capacity of the filler is decreased. Then, the user removes the bonnet and the stem to replace the filler. However, the connection between the stem and the spherical member is not firm. When the user removes the bonnet from the valve body, the stem may be inadvertently loosened, detached and even ejected from the spherical member damaging the user due to high fluid pressure inside the valve body.

SUMMARY OF THE INVENTION

An objective of the present invention is to provide a valve with an anti-loosening stem that is mounted firmly in a valve member. The valve prevents the anti-loosening stem from being jetted out of the valve member and damaging users who remove a bonnet to replace fillers.

To achieve the foregoing objective, the valve in accordance with the present invention comprises a valve body, a valve member, a bonnet, an anti-loosening stem and multiple fillers. The valve body has a passageway, a mounting boss and a first mounting hole. The passageway is defined axially through the valve body. The mounting boss protrudes from an outer surface of the valve body. The first mounting hole is defined axially through the mounting boss and communicates with the passageway. The valve member is mounted inside the valve body and has a first mounting part, a groove and a through hole. The first mounting part protrudes from an outer surface of the valve member and has a positioning hole that is defined axially through the first mounting part. The groove is defined in an inner surface of the positioning hole. The through hole is defined through the valve member and communicates with the positioning hole. The bonnet is mounted in the mounting boss of the valve body. The anti-loosening stem is mounted through the bonnet, is mounted in the valve member, and has a rod, an adjusting element and multiple embedding elements. The rod is mounted through the bonnet and the first mounting hole of the valve body, and has a second mounting part, multiple guiding holes and a connecting hole. The second mounting part is mounted in the positioning hole of the first mounting part and is formed in one of two ends of the rod. The guiding holes are defined radially through the second mounting part. The connecting hole is defined through an end surface of the second mounting part and communicates with the guiding holes. The adjusting element is mounted in the connecting hole and has a first abutting part that is formed at one of two ends of the adjusting element and corresponds to the guiding holes. The embedding elements are mounted movably inside the guiding holes respectively and abut the groove of the valve member. Each embedding element has a second abutting part. The second abutting part is disposed towards the connecting hole of the rod, abuts the first abutting part of the adjusting element, and is formed in one of two ends of the embedding element. The fillers are mounted in the first mounting hole, abut the bonnet and are mounted around the rod.

Other objectives, advantages and novel features of the invention will become more apparent from the following detailed description when taken in conjunction with the accompanying drawings.

DETAILED DESCRIPTION OF THE INVENTION

Figure 1:
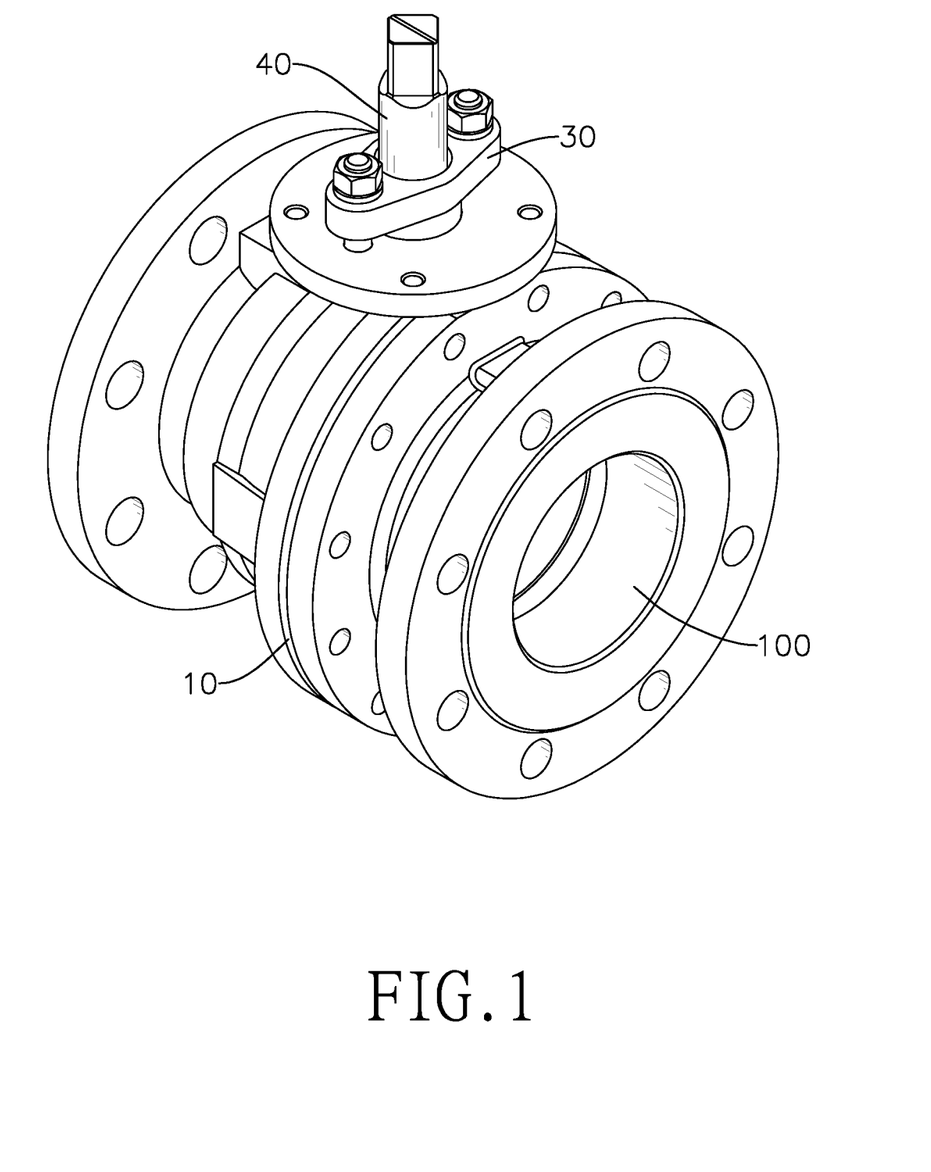
FIG. 1 is a perspective view of a valve in accordance with the present invention.
Figure 2:
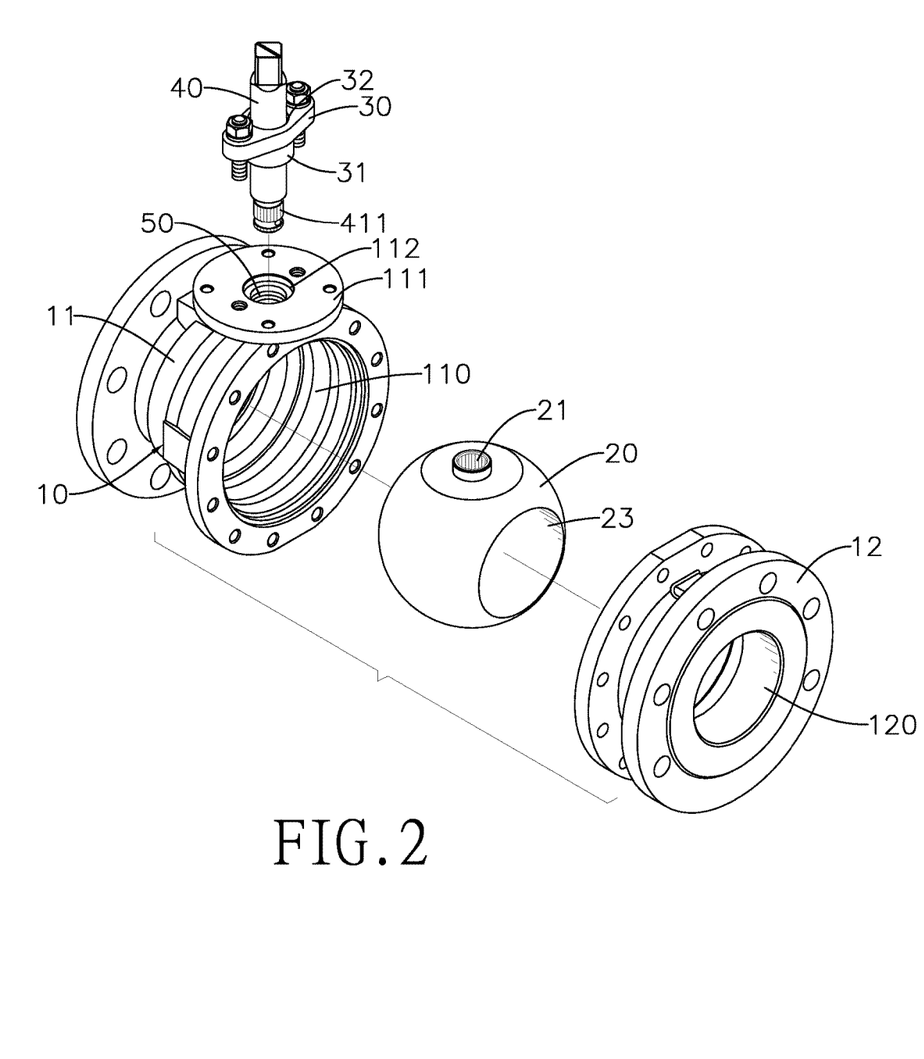
FIG. 2 is an exploded perspective view of the valve in FIG. 1.

With reference to FIGS. 1 and 2, a valve in accordance with the present application has a valve body 10, a valve member 20, a bonnet 30, an anti-loosening stem 40 and multiple fillers 50.

Figure 5:
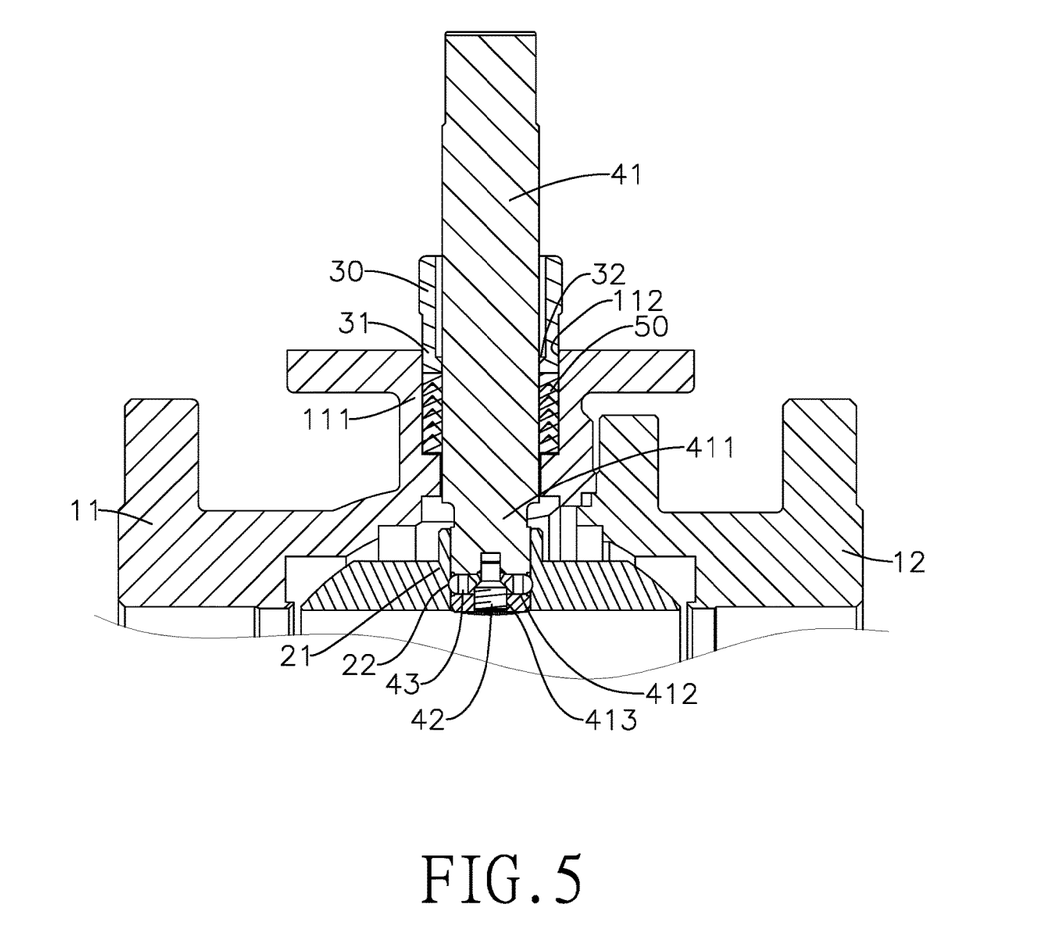
FIG. 5 is a front view in partial section of the valve in FIG. 1.

With reference to FIGS. 1, 2 and 5, the valve body 10 has a passageway 100, a first seat 11 and a second seat 12.

The passageway 100 is defined axially through the valve body 10.

The first seat 11 has a mounting boss 111, a first mounting hole 112 and a first communicating hole 110.

The mounting boss 111 protrudes from an outer surface of the first seat 11.

The first mounting hole 112 is defined axially through the mounting boss 111 and communicates with the passageway 100.

The first communicating hole 110 is defined through the first seat 11 and communicates with the first mounting hole 112.

The second seat 12 is mounted in one of two end surfaces of the first seat 11 and has a second communicating hole 120.

The second communicating hole 120 communicates with the first communicating hole 110 to form the passageway 100 and is defined through the second seat 12.

Figure 3:
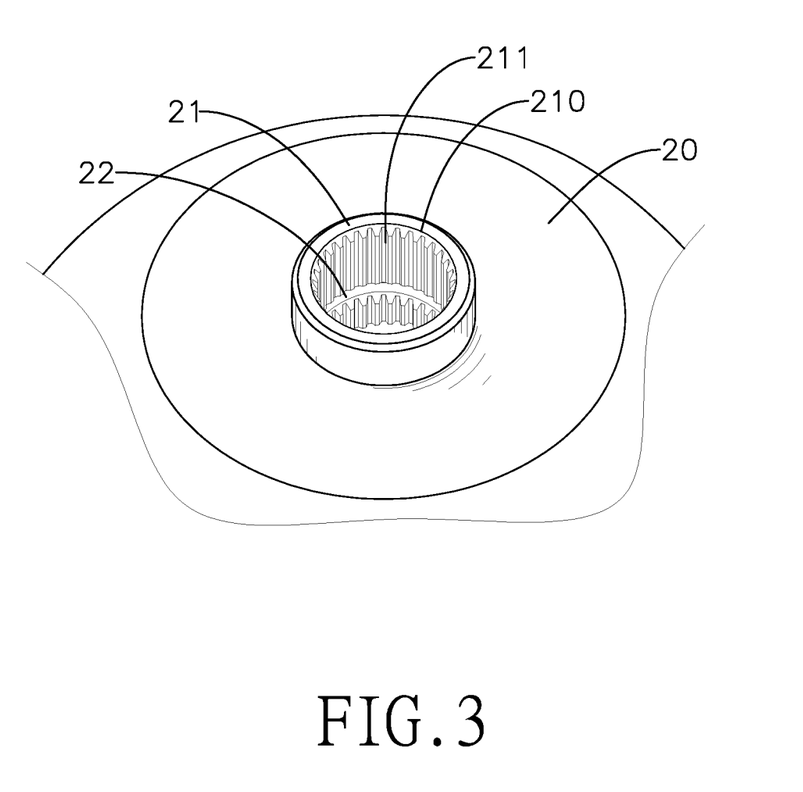
FIG. 3 is an enlarged perspective view of a valve member of the valve in FIG. 2.

With reference to FIGS. 2 and 3, the valve member 20 is mounted inside the valve body 10 and has a first mounting part 21, a groove 22 and a through hole 23.

The first mounting part 21 protrudes from an outer surface of the valve member 20 and has a positioning hole 210 and a first spline 211.

The positioning hole 210 is defined axially through the first mounting part 21.

The first spline 211 is formed in an inner surface of the positioning hole 210.

The groove 22 is defined in the inner surface of the positioning hole 210.

The through hole 23 is defined through the valve member 20 and communicates with the positioning hole 210.

With reference to FIGS. 2 and 5, the bonnet 30 is mounted in the mounting boss 111 of the first seat 11, and has an extending part 31 and a second mounting hole 32. Specifically, the bonnet 30 is mounted in the first seat 11 with multiple screw fasteners.

The extending part 31 is mounted through the first mounting hole 112 of the first seat 11 and protrudes from one of two end surfaces of the bonnet 30.

The second mounting hole 32 is defined axially through the bonnet 30 and the extending part 31.

Figure 4:
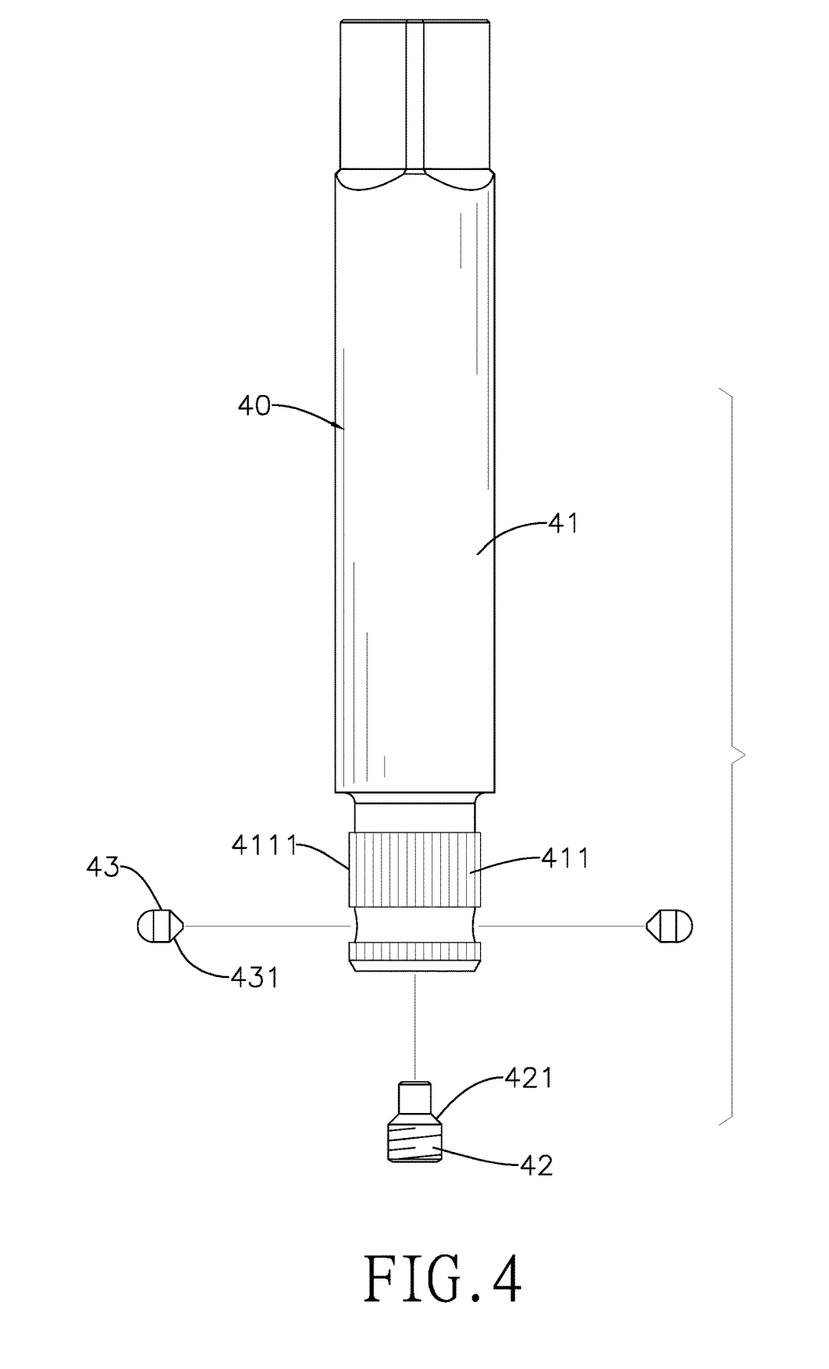
FIG. 4 is an exploded front view of the valve in FIG. 2.

With reference to FIGS. 2, 4 and 5, the anti-loosening stem 40 is mounted through the bonnet 30, is mounted in the valve member 20, and has a rod 41, an adjusting element 42, and multiple embedding elements 43.

The rod 41 is mounted through the second mounting hole 32 of the bonnet 30 and the first mounting hole 112 of the valve body 10, and has a second mounting part 411, multiple guiding holes 412, a connecting hole 413.

The second mounting part 411 is mounted in the positioning hole 210 of the first mounting part 21, is formed in one of two ends of the rod 41, and has a second spline 4111.

The second spline 4111 is engaged with the first spline 211 of the first mounting part 21 and is formed in an outer surface of the second mounting part 411. Because the second spline 4111 is engaged with the first spline 211 of the first mounting part 21, a user can drive the valve member 20 to rotate with the anti-loosening stem 40.

The guiding holes 412 are defined radially through the second mounting part 411.

The connecting hole 413 is defined through an end surface of the second mounting part 411 and communicates with the guiding holes 412. Specifically, the connecting hole 413 has an inner thread that is formed in an inner surface of the connecting hole 413.

The adjusting element 42 is mounted in the connecting hole 413 and has a first abutting part 421 that is formed in one of two ends of the adjusting element 42 and corresponds to the guiding holes 412. Specifically, the first abutting part 421 is an inclined surface and has an outer thread that is engaged with the inner thread of the connecting hole 413 by threading and is formed in an outer surface of the adjusting element 42.

The embedding elements 43 are mounted movably inside the guiding holes 412 respectively and abut the groove 22 of the valve member 20.

Each embedding element 43 has a second abutting part 431 that is disposed towards the connecting hole 413 of the rod 41, abuts the first abutting part 421 of the adjusting element 42, and is formed in one of two ends of the embedding element 43. Specifically, the second abutting part 431 is conical and abuts the inclined surface of the first abutting part 421, and the embedding element 43 is moved relative to the guiding holes 412 and abuts the groove 22.

With reference to FIGS. 2 and 5, the fillers 50 are mounted in the first mounting hole 112, abut the extending part 31 of the bonnet 30 and are mounted around the rod 41. Specifically, the fillers 50 may be O-rings. A degree of abutment between the fillers 50 and the extending part 31 is adjustable by rotating the screw fasteners.

Figure 6:
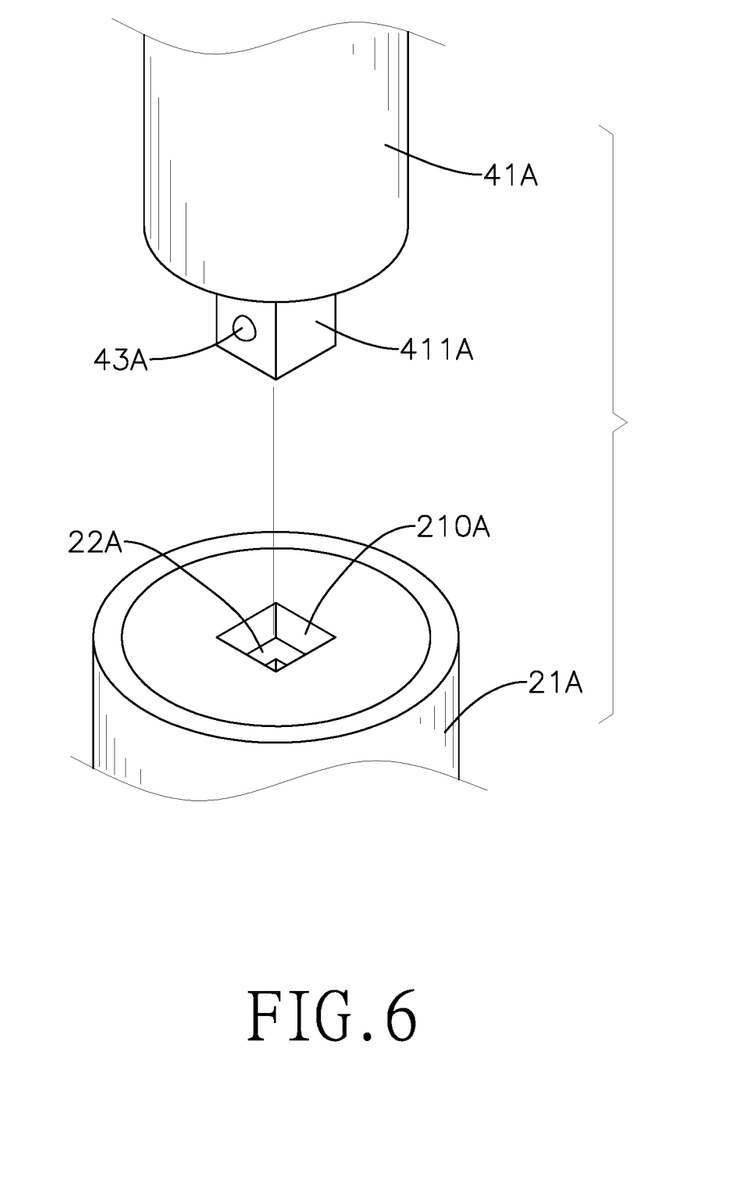
FIG. 6 is an enlarged exploded perspective view of a rod attaching a first mounting part of another embodiment of the valve.

With reference to FIG. 6, in another embodiment of the valve, the valve element 20 is attached to the anti-loosening stem 40. The positioning hole 210A of the first mounting part 21A is a rectangular hole. The groove 22A is defined in the inner surface of the positioning hole 210A. The second mounting part 411A of the rod 41A has a rectangular cross section corresponding to the positioning hole 210A. The embedding elements 43A are located movably in side surfaces of the second mounting part 411A respectively and abut the groove 22A.

Because the second mounting part 411,411A of the anti-loosening stem 40 is mounted in the first mounting part 21,21A of the valve member 20, the user can drive the valve member 20 to rotate with the anti-loosening stem 40. Meanwhile, because of the abutting between the embedding element 43,43A and the groove 22,22A, the anti-loosening stem 40 is mounted firmly in the valve member 20. The adjusting element 42 that is movably mounted in the rod 41 abuts the embedding elements 43,43A, and then the embedding elements 43,43A protrude movably and radially from the rod 41,41A.

When the user removes the bonnet 30 to replace the fillers 50, the anti-loosening stem 40 is prevented from jetting out of the valve member 20, being inadvertently detached and damaging the user due to high fluid pressure inside the valve body 10.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A valve comprising:
   a valve body having
      a passageway defined axially through the valve body;
      a mounting boss protruding from an outer surface of the valve body; and
      a first mounting hole defined axially through the mounting boss and communicating with the passageway;
   a valve member mounted inside the valve body and having
      a first mounting part protruding from an outer surface of the valve member and having a positioning hole defined axially through the first mounting part;
      a groove defined annually in an inner surface of the positioning hole; and
      a through hole defined through the valve member and communicating with the positioning hole;
   a bonnet mounted in the mounting boss of the valve body;
   an anti-loosening stem mounted through the bonnet, mounted in the valve member, and having a rod mounted through the bonnet and the first mounting hole of the valve body, and having
a second mounting part mounted in the positioning hole of the first mounting part and formed at one of two ends of the rod;
multiple guiding holes defined radially through the second mounting part; and
a connecting hole defined through an end surface of the second mounting part and communicating with the guiding holes;
an adjusting element mounted in the connecting hole and having a first abutting part formed in one of two ends of the adjusting element and corresponding to the guiding holes; and
multiple embedding elements mounted movably inside the guiding holes respectively, abutting the groove of the valve member, and each embedding element having a second abutting part disposed towards the connecting hole of the rod, abutting the first abutting part of the adjusting element, and formed at one of two ends of the embedding element; and
multiple fillers mounted in the first mounting hole, abutting the bonnet, and mounted around the rod.

2. The valve as claimed in claim 1, wherein the bonnet has
an extending part mounted through the first mounting hole of the valve body, abutting the fillers, and protruding from one of two end surfaces of the bonnet; and
a second mounting hole disposed around the rod of the anti-loosening stem and defined axially through the bonnet and the extending part.

3. The valve as claimed in claim 2, wherein
the connecting hole of the rod has an inner thread formed in an inner surface of the connecting hole;
the first abutting part of the adjusting element is an inclined surface and has
an outer thread engaged with the inner thread of the connecting hole by threading and formed in an outer surface of the adjusting element; and
the second abutting part of the embedding element is conical and abuts the inclined surface of the first abutting part.

4. The valve as claimed in claim 3, wherein
the first mounting part of the valve member has a first spline formed in the inner surface of the positioning hole; and
the second mounting part of the rod has a second spline engaged with the first spline of the first mounting part and formed in an outer surface of the second mounting part.

5. The valve as claimed in claim 4, wherein the valve body has
a first seat having
the mounting boss formed in an outer surface of the first seat; and
a first communicating hole defined through the first seat and communicating with the first mounting hole; and
a second seat mounted in one of two end surfaces of the first seat and having
a second communicating hole communicating with the first communicating hole to form the passageway and defined through the second seat.

6. The valve as claimed in claim 3, wherein
the positioning hole of the first mounting part is a rectangular hole;
the groove is defined in the inner surface of the positioning hole;
the second mounting part of the rod has a rectangular cross section corresponding to the positioning hole of the first mounting part; and
the embedding elements are located movably in multiple side surfaces of the second mounting part respectively and abut the groove.

7. The valve as claimed in claim 6, wherein the valve body has
a first seat having
the mounting boss formed in an outer surface of the first seat; and
a first communicating hole defined through the first seat and communicating with the first mounting hole; and
a second seat mounted in one of two end surfaces of the first seat and having
a second communicating hole communicating with the first communicating hole to form the passageway and defined through the second seat.

8. The valve as claimed in claim 1, wherein
the connecting hole of the rod has an inner thread formed in an inner surface of the connecting hole;
the first abutting part of the adjusting element is an inclined surface and has
an outer thread engaged with the inner thread of the connecting hole by threading and formed in an outer surface of the adjusting element; and
the second abutting part of the embedding element is conical and abuts the inclined surface of the first abutting part.

9. The valve as claimed in claim 8, wherein
the first mounting part of the valve member has a first spline formed in the inner surface of the positioning hole; and
the second mounting part of the rod has a second spline engaged with the first spline of the first mounting part and formed in an outer surface of the second mounting part.

10. The valve as claimed in claim 9, wherein the valve body has
a first seat having
the mounting boss formed in an outer surface of the first seat; and
a first communicating hole defined through the first seat and communicating with the first mounting hole; and
a second seat mounted in one of two end surfaces of the first seat and having
a second communicating hole communicating with the first communicating hole to form the passageway and defined through the second seat.

11. The valve as claimed in claim 8, wherein
the positioning hole of the first mounting part is a rectangular hole;
the groove is defined in the inner surface of the positioning hole;
the second mounting part of the rod has a rectangular cross section corresponding to the positioning hole of the first mounting part; and
the embedding elements are located movably in multiple side surfaces of the second mounting part respectively and abut the groove.

12. The valve as claimed in claim 11, wherein the valve body has
a first seat having
the mounting boss formed in an outer surface of the first seat; and a first communicating hole defined through the first seat and communicating with the first mounting hole; and a second seat mounted in one of two end surfaces of the first seat and having a second communicating hole communicating with the first communicating hole to form the passageway and defined through the second seat.

\* \* \* \* \*